United States Patent
Vitanov et al.

(10) Patent No.: US 7,472,247 B2
(45) Date of Patent: Dec. 30, 2008

(54) METHOD AND SYSTEM FOR CENTRALIZED MEMORY MANAGEMENT IN WIRELESS TERMINAL DEVICES

(75) Inventors: Kamen B. Vitanov, Mississauga (CA); Viera Bibr, Kilbride (CA); Michael Shenfield, Richmond Hill (CA); Bryan R. Goring, Milton (CA); Brindusa L. Fritsch, Toronto (CA); Kenneth Wallis, Oakville (CA)

(73) Assignee: Research in Motion Limited, Waterloo, Ontario (CA)

( * ) Notice: Subject to any disclaimer, the term of this patent is extended or adjusted under 35 U.S.C. 154(b) by 376 days.

(21) Appl. No.: 11/216,140

(22) Filed: Sep. 1, 2005

(65) Prior Publication Data

US 2006/0253680 A1    Nov. 9, 2006

Related U.S. Application Data

(60) Provisional application No. 60/672,092, filed on Apr. 18, 2005.

(51) Int. Cl.
*G06F 12/00* (2006.01)
(52) U.S. Cl. .................. 711/170; 711/171
(58) Field of Classification Search .......... None
See application file for complete search history.

(56) References Cited

U.S. PATENT DOCUMENTS

| 5,428,545 | A | 6/1995 | Maegawa et al. |
|---|---|---|---|
| 6,092,160 | A | 7/2000 | Marsters |
| 2002/0069213 | A1 | 6/2002 | Moslander et al. |
| 2003/0032417 | A1 | 2/2003 | Minear et al. |
| 2003/0214970 | A1 | 11/2003 | Pimentel et al. |
| 2005/0021917 | A1* | 1/2005 | Mathur et al. .......... 711/159 |
| 2006/0150190 | A1* | 7/2006 | Gusler et al. .......... 718/105 |

FOREIGN PATENT DOCUMENTS

| EP | 1187432 | 9/2000 |
|---|---|---|
| EP | 1233635 | 8/2002 |
| EP | 1453332 | 9/2004 |
| WO | WO 03/009144 | 1/2003 |
| WO | WO 2004/010306 | 1/2004 |

OTHER PUBLICATIONS

International Preliminary Report on Patentability issued Jul. 27, 2007 on corresponding International PCT Patent Application Serial No. PCT/CA2005/001328.

* cited by examiner

*Primary Examiner*—Reginald G. Bragdon
*Assistant Examiner*—Ngoc V Dinh

(57) ABSTRACT

Methods and systems for controlling centralized memory management in wireless terminal devices. Memory management scripts associated with a wireless application are stored in a registry accessible through a data network for on-demand download and execution. A memory management kernel in each terminal device monitors a memory utilization of the terminal device. Based on the memory utilization, the memory management kernel interacts with an application gateway hosting the terminal device to download and execute one or more of the memory management scripts.

16 Claims, 4 Drawing Sheets

METHOD AND SYSTEM FOR CENTRALIZED MEMORY MANAGEMENT IN WIRELESS TERMINAL DEVICES

CROSS-REFERENCE TO RELATED APPLICATIONS

This application is based on, and claims benefit of 35 U.S.C. § 119(e) of Provisional Patent Application No. 60/672,092 filed Apr. 18, 2005.

MICROFICHE APPENDIX

Not applicable

TECHNICAL FIELD

The present invention relates to wireless communications devices, and in particular to a method and system for centralized memory management in wireless terminal devices.

BACKGROUND OF THE INVENTION

The number and variety of wireless terminal devices, such as mobile telephones, personal computers and PDAs with wireless communication capabilities, self-service kiosks and two-way pagers is rapidly increasing. Software applications which run on these devices increase their utility. For example, a mobile phone may include an application which retrieves the weather for a range of cities, or a PDA may include an application that allows a user to shop for groceries. These software applications take advantage of the connectivity to a network in order to provide timely and useful services to users.

As is well known in the art, wireless terminal devices commonly have limited memory resources, with the result that ongoing handling of low-memory conditions is required. Wireless applications developers try to address these issues various known means, such as by utilizing software design techniques that require less memory, optimizing internal data structures, limiting the amount of data that users can exploit using the application, and/or by removing (deleting) redundant data or code. Since applications are designed to operate independently of one another, the implementation of these approaches is normally unique to each application, which means that every application installed on a terminal device will have its own memory management code. This "duplication" of memory management software consumes additional memory, and so further reduces available memory resources. A further limitation of this arrangement is that it requires the software developer(s) to have experience in memory optimization techniques and be explicitly aware of the memory restrictions of every device type. This creates a barrier to the development of new wireless applications.

Accordingly, improved methods and systems for managing low-memory conditions in wireless terminal devices remains highly desirable.

SUMMARY OF THE INVENTION

Accordingly, an object of the present invention is to provide methods and systems for centralized memory management in wireless terminal devices.

This object is met by the features of the invention defined in the appended independent claims. Further optional features are defined in the dependent claims.

Thus, an aspect of the present invention provides a method of controlling centralized memory management of a terminal device of a wireless network. In accordance with the present invention, a memory utilization on the terminal device is monitored, and used to set an operational state of a memory management kernel. Execution of one or more memory management scripts is controlled based on the operational state of the memory management kernel.

A further aspect of the present invention provides a terminal device of a wireless network, the terminal device comprising a computer readable medium storing software code implementing a memory management kernel for executing the steps of: monitoring a memory utilization on the terminal device; setting an operational state based on the monitored memory utilization; and controlling execution of one or more memory management scripts based on the operational state.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and systems for centralized memory management in wireless terminal devices. Embodiments of the invention are described below, by way of example only, with reference to FIGS. 1-5.

Figure 1:
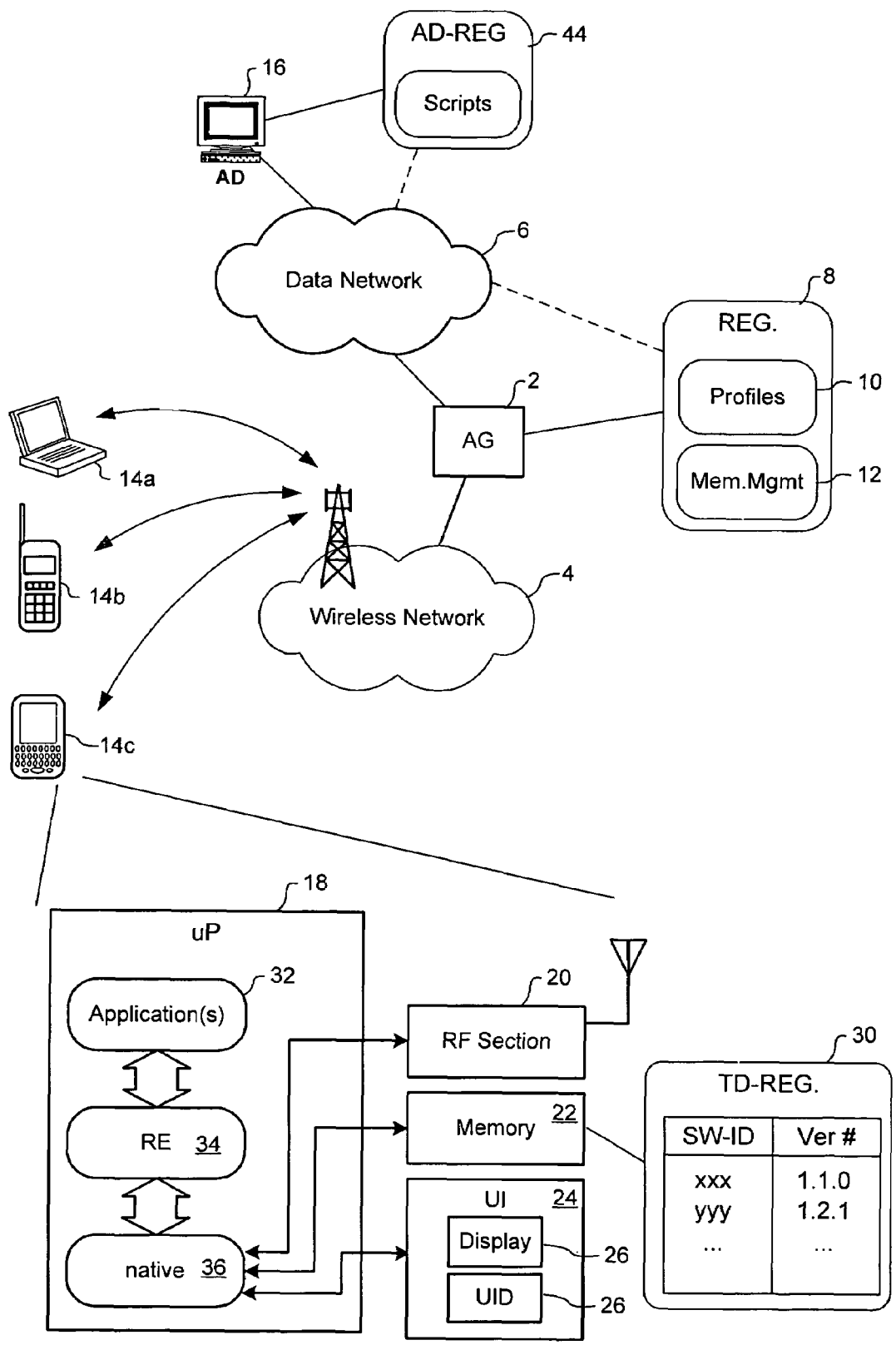
FIG. 1 is a block diagram schematically illustrating a network system.

Referring to FIG. 1, a network in which the present invention may be utilised generally comprises an Application Gateway (AG) 2 coupled between a wireless network 4 and a data network 6, such as for example, the Internet; and a registry 8 comprising a profiles registry 10 and a memory management registry 12. The profiles registry 10 preferably contains, for each subscriber's terminal device 14, a respective profile which contains information identifying each application installed on the terminal device 14. The memory management registry 12 preferably contains, for each one of a plurality of wireless applications, one or more memory management scripts that may be used to reduce the memory utilized by the respective application. These memory management scripts will normally be provided by the application developer, and may either be stored in the memory management registry memory management 12 itself, or on a remote "back-end" server 16 maintained by the application developer. In the later case, the registry 12 will contain a link to each script, rather than the script code itself. The Registry 8 can be co-resident with the AG 2 or may be located remotely from the AG 2 and accessed by the AG 2 via the data network 8.

The AG 2 generally operates to mediate message flows between terminal devices 14 connected to the wireless network 4 and data services accessible through the data network 6 in the manner described in Applicant's co-pending United States Patent Publications Nos. 2004/0215700 and 2004/0220998, the contents of both of which are incorporated herein by reference.

Figure 2:
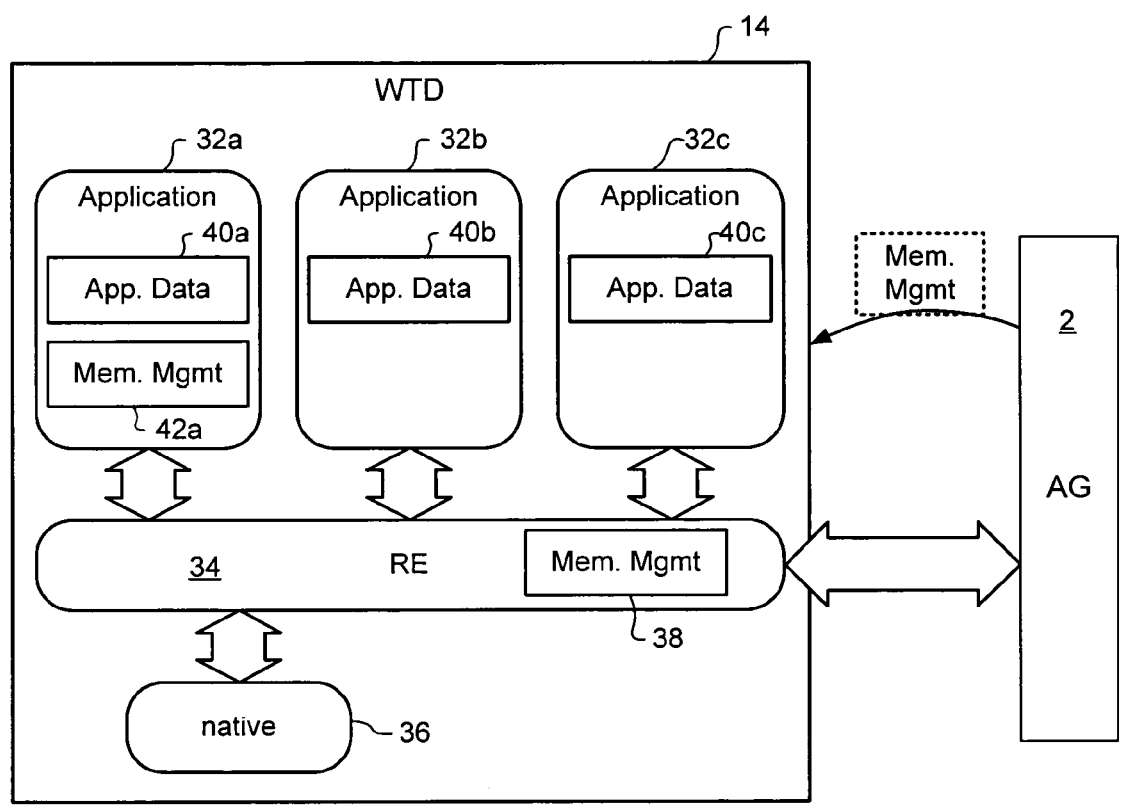
FIG. 2 is a block diagram schematically illustrating components and operation of a representative centralized memory management system in accordance with an embodiment of the present invention.

In general, the terminal devices 14 can be any of a wide variety of software-controlled wireless devices including, but not limited to mobile telephones, personal computers and PDAs with wireless communication capabilities, self service kiosks and two-way pagers. As may be seen in FIG. 1, such devices generally comprise a microprocessor 18 connected to an RF section 20 for wireless communications, a memory 22 (at least a portion of which will normally be non-volatile), and user interface (UI) 24 including a display 26 and one or more user input/output devices (e.g. keyboard, thumb-wheel, stylus, microphone, speaker etc.) 28. The memory 22 is used, inter alia, to store a Terminal Device Registry 30 which stores information identifying each application installed on the terminal device 14. The microprocessor 18 operates under software control to provide the functionality of the terminal device 14. As shown in FIG. 2, the software is preferably designed on a layered model, in which one or more wireless applications 32 control the user's experience of the terminal device 14, and a runtime environment (RE) 34 translates between the application software 32 and the native machine-language 36 of the terminal device 14 to control the terminal device hardware, and communicate with data services. This layered software model, and the manner in which it operates is known from Applicant's co-pending United States Patent Publications Nos. 2004/0215700 and 2004/0220998.

As shown in FIG. 2, the RE 34 also includes a memory management kernel 38, which enables the RE 32 to monitor memory utilization and interact with the AG 2 to implement centralized memory management, as will be described in greater detail below.

As may also be seen in FIG. 2, each application 32 will normally contain application logic (e.g. XML or Java program code) and application data 40. Each application may, or may not, include "embedded" memory management functionality 42. In wireless network systems utilizing centralized memory management in accordance with the present invention, it is expected that application developers will increasing elect to abbreviate any such embedded memory management functionality 42, or omit it entirely in favour of the centralized memory management system, as will be described in greater detail below.

As described in Applicant's co-pending United States Patent Publications Nos. 2004/0215700 and 2004/0220998, operation of the AG 2 enables a software application 32 executing in a terminal device 14 to communicate with data services (not shown) offered through the data network 6. This operation may, for example, including accessing and downloading files from back-end data sources (not shown) connected to the data network 6. As may be seen in FIG. 1, and described in greater detail below, an application developer can also distribute and support their software through the data network 6. For example, downloadable application software, installation scripts and memory management scripts can be stored in a registry 44 of a back-end server 16 which is maintained by the application developer and which can be accessed by users (either directly or indirectly) through the data network 6. In the particular case of memory management scripts, it is convenient to use this mechanism for "download-on-demand" distribution, because it reduces resource requirements of the AG 2, and facilitates maintenance and updating of the scripts by the application developer. In order to enable "on-demand" downloading of memory management scripts, the application developer can formulate and send a registration message to the AG 2. The registration message may include, for example, a software identifier (Software-ID) which uniquely identifies the involved wireless application, and a link (e.g. a URL) to each memory management script associated with that wireless application. On the basis of the registration message, the AG 2 can then save the script URL(s) in the memory management registry 12, for use as required by terminal devices 14 hosted by the AG 2, as will be described in greater detail below.

Application Development Environment (Studio)

Figure 3:
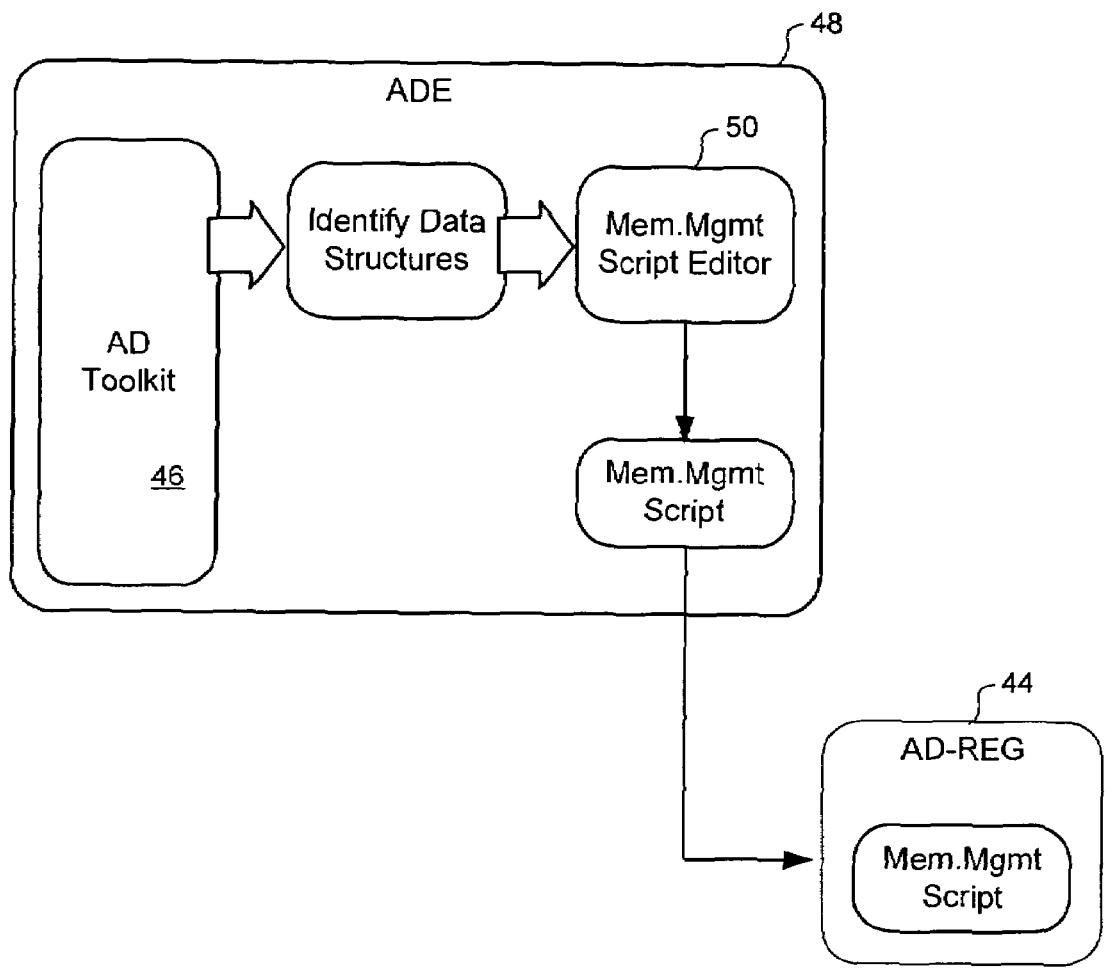
FIG. 3 is a block diagram schematically illustrating elements and operation of an application development environment in accordance with a representative embodiment of the present invention.
Figure 4:
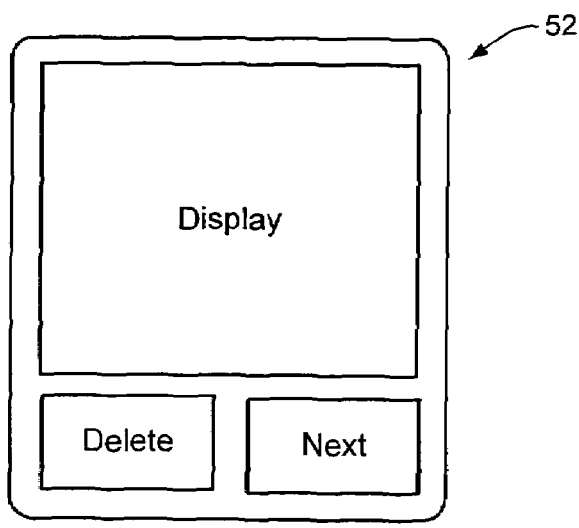
FIG. 4 is a representative user interface screen generated by a memory management script in accordance with an aspect of the present invention.

Referring now to FIG. 3, the application developer uses an application development toolkit (ADT) 46 of an application development environment (ADE) 48 to code, test, and debug application software, in a manner generally known in the art. This same ADE 48 can also be used for developing memory management logic for the application. As mentioned previously, memory management functionality is conventionally embedded within the application logic, and operates to reduce the amount of memory resources used by the application. Various methods that may be implemented including, without limitation: categorization or prioritization of application data; deletion of temporary files; deletion of low priority and/or non-essential application data; deletion of "download-on-demand" resources such as images, sounds, animation) which can be retrieved from a server over the air when required by an application; and deletion of non-essential application logic such as automatic application update scripts.

As will be appreciated, all of these functions must necessarily take into account the specifics of each application. Accordingly, the ADE 48 preferably also includes a memory management script editor 50 for assisting the application developer to generate one or more memory management scripts as part of the application development process. Each of the generated memory management scripts can be stored in the AD registry 44, which enables the script(s) to be downloaded to a terminal device 14 separately from the application itself.

In general, the memory management script editor 50 analyses the application source code to identify data structures instantiated by the application during runtime. The application developer can then select those data structures which can be safely de-allocated to free up device resources. In addition to the items noted above, top-most data structures that are not contained in any other data structures are typically available for de-allocation, along with any contained data inside those data structure instances. For example, consider a data component of type "Horse", which contains a data component of type "Race". If the user deletes all instances of "Horse" data (the top-most data structure), the memory management script can automatically delete all instances of "Race" data contained within instances of "Horse", since it can no longer be referenced. Based on knowledge of data structures which can be safely de-allocated, the memory management script editor 50 can automatically generate a memory management script which:

(a) provides a user interface 52 (FIG. 4) for showing the device's user stored data (that is, instances of top-most data structures) that can be safely deleted, and allowing the user to select data for deletion; and (b) deletes stored data in accordance with the user's input. As mentioned above, this function would include deletion of all lower-level data structures contained within any deleted top-level data structures.

If desired, the application developer can use the memory management script editor 50 to prepare a single memory management script, which includes all of the memory management functionality associated with a respective application. Alternatively, two or more scripts can be prepared, each script providing respective different memory management functions. For example, the application developer could prepare one script for categorizing application data as low or high priority; a second script for deleting temporary files; a third script for deleting on-demand resources; and a fourth for deleting low priority application data and for identifying and removing non-essential application logic. As a still further alternative, some memory management functionality (e.g. prioritization of application data, and deletion of temporary files) may be embedded within the application, and other memory management functionality encoded within memory management scripts. In all cases, the memory management scripts are designed by the application developer taking into account the particulars of the respective application, and are designed to execute within the context of the application.

The application developer can also tag each script with a "use" rating, to control how the scripts are used. For example, a script that will have no discernable effect on the user's experience of the application, and which can therefore be used during normal operations (e.g. a script to delete temporary files) can be tagged with a "Normal" use rating. A script which will likely cause a minor inconvenience to the user, and which would therefore be used in a limited memory scenario (e.g. a script to delete download-on-demand resources) can be tagged with a "Limited" use rating. A script which will likely cause a significant impairment of use of the application, and which would therefore be used in a critical memory scenario (e.g. a script to delete low priority application data) can be tagged with a "Critical" use rating.

Centralized Memory Management

Figure 5:
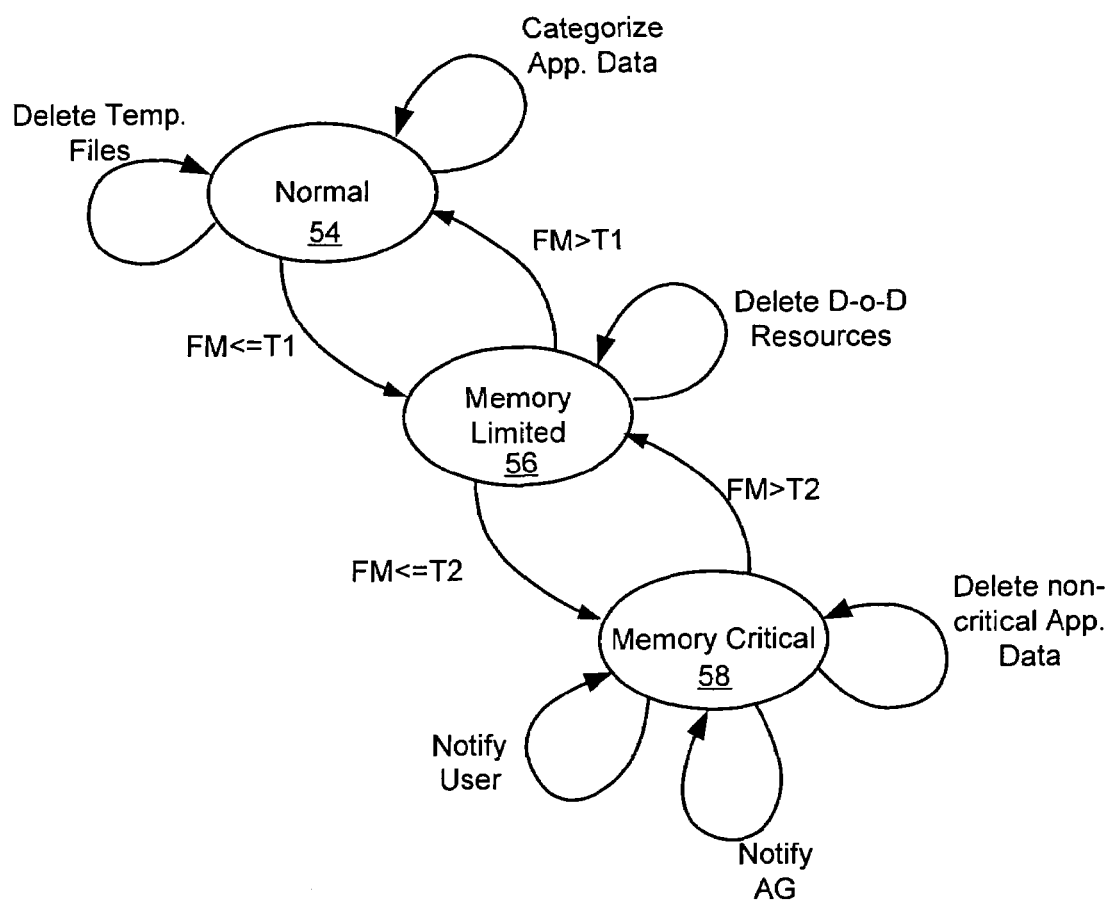
FIG. 5 is a state diagram illustrating operational states of the centralized memory management system of FIG. 2.

As mentioned above, the RE 34 includes a memory management kernel 38 (FIG. 2), which enables the RE 34 to interact with the native layer 36 to monitor memory utilization and communicate with the AG 2 to implement centralized memory management. FIG. 5 is a state diagram illustrating representative operational states of the memory management kernel 38, and representative memory management functionality that can be executed within each state.

Referring to FIG. 5, in a "Normal" state 54, the memory management kernel 38 monitors memory utilization, for example by comparing the amount of free memory (FM) that is available at any given time to a predetermined first threshold (T1). However, the memory management kernel 38 of the RE 34 does not take any action to control memory utilization or free up memory. Instead, memory management functionality 42 (if any) embedded within each application 32 is allowed to operate, for example to categorize/prioritize application data and delete temporary files.

If the amount of free memory drops to the first threshold (T1), the RE memory management kernel 38 transitions to a "Memory Limited" state 56. In this state, memory management scripts are used to reduce the amount of memory used by each installed application 32, but without affecting application data. For example, download-on-demand features, which can be restored as needed during run-time of an application, can be deleted. As mentioned above, this functionality must take into account the particulars of each application, and thus will be controlled by scripts provided by the application developer. Accordingly, for each installed application 32, the RE 34 communicates with the AG 2 to access and download the applicable memory management scripts, either from the AG registry 8, or from a back-end server 16 maintained by the application developer, as described above. Thus, for example, the RE 34 can use the TD registry 30 (FIG. 1) to obtain the respective software identifier (software-ID) information for each installed application. This information is inserted into a memory management message having a "Memory Limited" indication, which is sent to the AG 2. In response to the "Memory Limited" message, the AG 2 searches its registry 8 to identify memory management scripts associated with each application (as identified by the software-ID information) and uses the "use rating" associated with each script to select those scripts that are appropriate to the "Memory Limited" state of the RE memory management kernel 38. The selected memory management scripts are then downloaded to the terminal device 14 and executed by the RE 34. Once each script has been used, it can be deleted so as to avoid unnecessarily taking up memory space.

If, as a result of the above operations, the amount of free memory increases above the first threshold (T1), the RE memory management kernel 38 returns to the "Normal" state 54, and memory management functionality continues as described above for that state.

However if, in spite of the actions taken in the "Memory Limited" state, the amount of free memory further drops to a second threshold (T2), the RE memory management kernel 38 transitions to a "Memory Critical" state 58. In this state, aggressive actions are taken to reduce the amount of memory used by each installed application, and this may affect application data. For example, non-critical or low priority application data and/or application logic can be deleted. As with the deletion of download-on-demand features, this functionality must take into account the particulars of each application, and thus will be controlled by memory management scripts provided by the application developer as described above. Thus, for example, the RE 34 can a formulate a "Memory Critical" message, which is sent to the AG 2. In response to the "Memory Critical" message, the AG 2 retrieves corresponding memory management scripts (or links thereto) from its registry 8, using the "use rating" assigned by the application developer to select scripts that are appropriate to the "Memory Critical" state of the RE memory management kernel 38.

If desired, the RE memory management kernel 38 can also implement various functions in the "Memory Critical" state 58, which are independent of any one application. Representative application-independent functions include, without limitation:

Notifying the user; and

Identifying applications that are infrequently used, or which have not been used for an extended period of time. User interface screens such as the example shown in FIG. 4 can be provided to enable the user to select and delete any such applications and their associated application data. These user interface screens may be provided in a script downloaded from the AG 2 by the RE memory management kernel 36, and subsequently deleted once it has served its purpose.

In addition to sending memory management scripts (or links thereto) in response to the "Memory Critical" message, the AG 2 may, for example, limit messaging traffic to the terminal device 14, so as to reduce the memory resources required by any one application.

If, as a result of the above operations, the amount of free memory increases above the second threshold (T2), the RE memory management kernel 38 returns to the "Memory Limited" state 56, and memory management operations continue as described above for that state.

As will be appreciated, normal operation of a wireless application 32 can produce large transients in memory utilization. This can produce short term fluctuations in the free memory, which may unnecessarily force the RE memory management kernel 38 into "Memory Limited" or "Memory Critical" states. Accordingly, it is preferable to introduce a delay function, which serves to reduce the sensitivity of the RE memory management kernel 38 to short term fluctuations in the free memory. This may be accomplished in various ways. For example, the RE memory management kernel 38 can be programmed to transition from Normal to Memory Limited states only if the free memory remains below the first threshold (T1) for a predetermined period of time. Such a time period may be indicated, for example, by a clock function (or any equivalent function which is well known in the art) that starts when the free memory crosses the threshold value. This same approach may be used (with appropriate adjustments) for controlling the other possible state transitions. Instead of a clock function, the RE memory management Kernel 38 could control state transitions based on a running average free memory computed over a suitable time interval (or, equivalently, a selected number of samples of the free memory taken at regular time intervals).

It will also be appreciated that execution of the memory management functions executed during the Memory Limited and Memory Critical states could well disrupt use of the terminal device 14. For example, if the RE memory management kernel 38 transitions to either of the Memory Critical state 58 while a wireless application is in use, immediate downloading and execution of scripts to identify and delete seldom-used applications may be extremely inconvenient to the user. Accordingly, when the RE memory management kernel 38 transitions to either of the Memory Limited and Memory Critical states, it may delay execution of some (or all) of its memory management operations. Thus, for example, upon a transition to the Memory Critical state 58, the RE memory management kernel 38 may provide the user with a "low memory" warning as a "pop-up" message, and possibly send a warning message to the AG 2. However, downloading and execution of scripts to delete low priority application data and/or logic, for example, may be delayed until the terminal device 14 becomes idle (i.e. when there is no user activity on the device for a predefined amount of time).

The embodiment(s) of the invention described above is(are) intended to be exemplary only. The scope of the invention is therefore intended to be limited solely by the scope of the appended claims.

We claim:

1. A method of controlling centralized memory management of a terminal device of a wireless network, the method comprising steps of:
    monitoring a memory utilization on the terminal device;
    setting an operational state of a memory management kernel based on the monitored memory utilization; and
    controlling execution of one or more memory management scripts based on the operational state of the memory management kernel,
    wherein the operational state comprises any one of:
        a "Normal" state indicative of a normal memory condition of the terminal device;
        a "Memory Limited" state indicative of a low memory condition of the terminal device; and
        a "Memory Critical" state indicative of a critically low memory condition of the terminal device; and
    wherein, when the operational state is either "Memory Limited" or "Memory Critical", the step of controlling execution of one or more memory management scripts comprises steps of:
        formulating a memory management message including an indication of the operational state, and forwarding the memory management message to an application gateway;
        subsequently receiving information identifying one or more memory management scripts from the application gateway;
        downloading each identified memory management script; and
        executing each downloaded memory management script.

2. A method as claimed in claim 1, wherein the step of monitoring a memory utilization comprises a step of detecting an amount of free memory.

3. A method as claimed in claim 2, wherein the step of detecting an amount of free memory is repeated at predetermined intervals, to obtain a series of sequential samples, and wherein the step of monitoring the memory utilization comprises a step of computing an average over a predetermined number of samples.

4. A method as claimed in claim 2, wherein the step of setting the operational state of the memory management kernel comprises steps of:
    comparing the detected amount of free memory to at least one threshold; and
    setting the operational state based on the comparison result.

5. A method as claimed in claim 4, wherein the steps of comparing the detected amount of free memory to a threshold and setting the operational status comprise steps of:
    setting the operational state to a "Normal" condition if the detected amount of free memory is equal to or greater than a first threshold value;
    setting the operational state to a "Memory Limited" condition if the detected amount of free memory is less than the first threshold value and equal to or greater than a second threshold value; and
    setting the operational state to a "Memory Critical" condition if the detected amount of free memory is less than the second threshold value.

6. A method as claimed in claim 1, wherein the step of controlling execution of one or more memory management scripts further comprises a step of deleting each downloaded memory management script after execution of the script has completed.

7. A method as claimed in claim 1, wherein the step of controlling execution of one or more memory management scripts further comprises a step of generating a warning message to a user of the terminal device.

8. A method as claimed in claim 1, wherein the step of controlling execution of one or more memory management scripts further comprises steps of:
    identifying a seldom used application installed on the terminal device; and
    generating a user interface screen to enable a user of the terminal device to delete the identified seldom used application.

9. A terminal device of a wireless network, the terminal device comprising a computer readable medium storing software code implementing a memory management kernel for executing the steps of:

monitoring a memory utilization on the terminal device;

setting an operational state based on the monitored memory utilization; and controlling execution of one or more memory management scripts based on the operational state, wherein the operational state comprises any one of:

a "Normal" state indicative of a normal memory condition of the terminal device;

a "Memory Limited" state indicative of a low memory condition of the terminal device; and a "Memory Critical" state indicative of a critically low memory condition of the terminal device; and wherein, when the operational state is either "Memory Limited" or "Memory Critical", the step of controlling execution of one or more memory management scripts comprises steps of:

formulating a memory management message including an indication of the operational state, and forwarding the memory management message to an application gateway;

subsequently receiving information identifying one or more memory management scripts from the application gateway;

downloading each identified memory management script; and executing each downloaded memory management script.

10. A terminal device as claimed in claim 9, wherein the step of monitoring a memory utilization comprises a step of detecting an amount of free memory.

11. A terminal device as claimed in claim 10, wherein the step of detecting an amount of free memory is repeated at predetermined intervals, to obtain a series of sequential samples, and wherein the step of monitoring the memory utilization comprises a step of computing an average over a predetermined number of samples.

12. A terminal device as claimed in claim 10, wherein the step of setting the operational state comprises steps of:

comparing the detected amount of free memory to at least one threshold; and setting the operational state based on the comparison result.

13. A terminal device as claimed in claim 12, wherein the steps of comparing the detected amount of free memory to a threshold and setting the operational status comprise steps of:

setting the operational state to a "Normal" condition if the detected amount of free memory is equal to or greater than a first threshold value;

setting the operational state to a "Memory Limited" condition if the detected amount of free memory is less than the first threshold value and equal to or greater than a second threshold value; and setting the operational state to a "Memory Critical" condition if the detected amount of free memory is less than the second threshold value.

14. A terminal device as claimed in claim 9, wherein the step of controlling execution of one or more memory management scripts further comprises a step of deleting each downloaded memory management script after execution of the script has completed.

15. A terminal device as claimed in claim 9, wherein the step of controlling execution of one or more memory management scripts further comprises a step of generating a warning message to a user of the terminal device.

16. A terminal device as claimed in claim 9, wherein the step of controlling execution of one or more memory management scripts further comprises steps of:

identifying a seldom used application installed on the terminal device; and generating a user interface screen to enable a user of the terminal device to delete the identified seldom used application.

* * * * *